W. W. WILSON.
Egg-Tester.
No. 166,671. Patented Aug. 10, 1875.
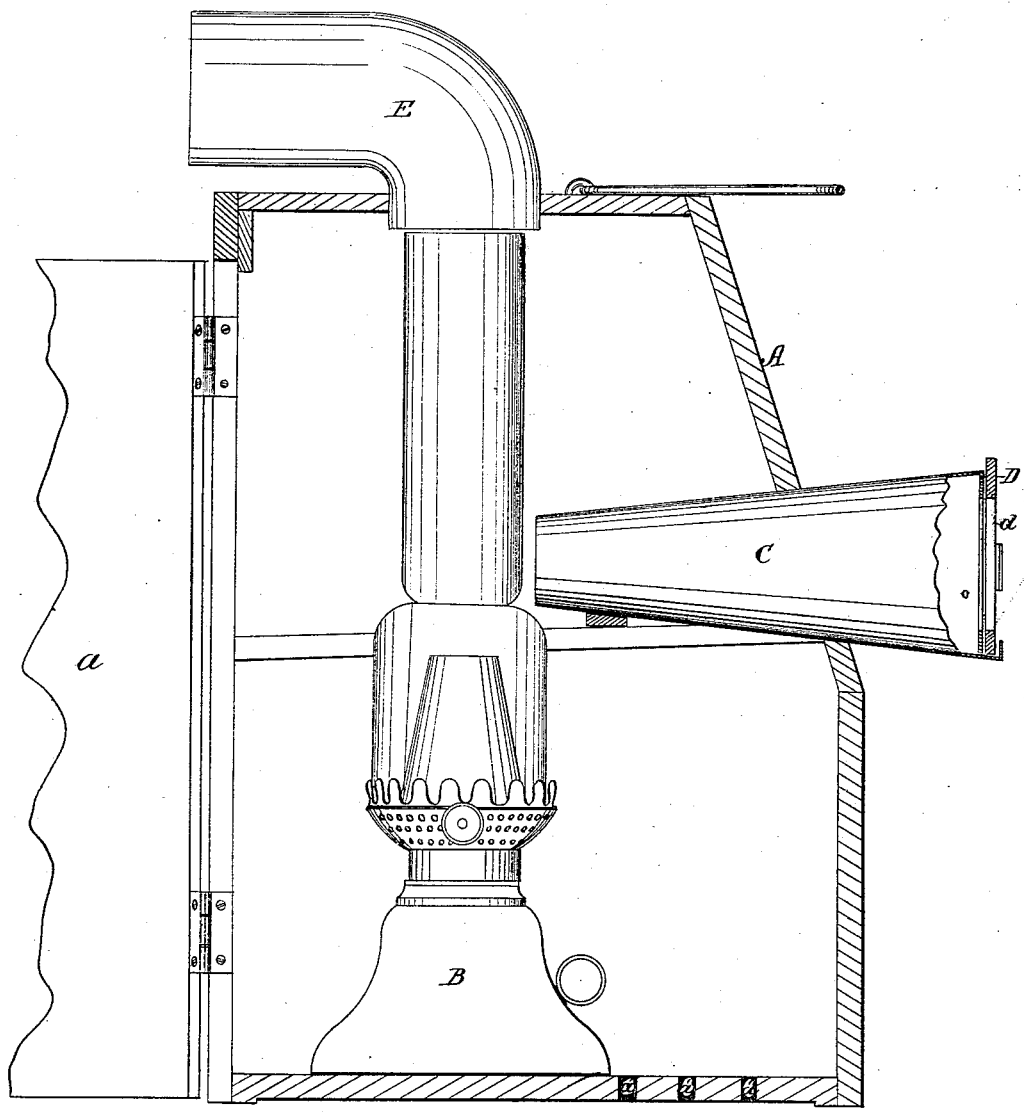
WITNESSES:
INVENTOR:

UNITED STATES PATENT OFFICE.

WILLIAM W. WILSON, OF PARKVILLE, MISSOURI.

IMPROVEMENT IN EGG-TESTERS.

Specification forming part of Letters Patent No. 166,671, dated August 10, 1875; application filed June 19, 1875.

*To all whom it may concern:*

Be it known that I, WILLIAM W. WILSON, of Parkville, in the county of Platte and State of Missouri, have invented a new and Improved Egg-Tester; and I do hereby declare that the following is a full, clear, and exact description of the same, reference being had to the accompanying drawing, forming a part of this specification, in which the figure is a sectional elevation.

The invention relates to that class of devices employed to test the freshness of eggs by bringing them between the eye and a strong light.

The invention consists in novel means for doing this, the same being first described in connection with drawing, and then pointed out in the claim.

A represents a case, provided with door *a* and lamp B. Over the latter is placed, horizontally, a tapering tube or reflector, C, whose largest end passes outside the case, while the smallest extends to the edge of burner, so that the blaze may rise directly in front thereof. This tube has a cap, D, in which is a central hole, *d*, wherein the egg is inserted. The light having no avenue of escape except through the tube, and the operator being in a dark room, an egg is seen in a moment to be transparent and fresh, or otherwise. The case is provided on the bottom with inlet-holes *a'* to furnish air to support combustion, while the chimney or pipe E creates a draft and carries off the heat and products of combustion.

To prepare the tester for use, the operator places it on a box or bench, just high enough to admit the knees under the bench, the tester being directly in front of the operator, with the reflector pointing to the right and the draft-pipe pointing to the left. The box containing the eggs to be examined is then located at the left hand, and a box to receive the examined eggs on the right hand. By having the knees under the bench it enables the one examining the eggs to get at the tester in an easy manner, thus making the work very easy and rapid. The lamp in the tester is then lighted and the blaze turned up until it covers the small end of the reflector. The door being then closed, the only light that will escape will come through the reflector. The operator then sits down, and with the left hand picks up three eggs and applies them singly to the reflector until they are tested. He then lays them down, with the right hand, and, while laying them down, can easily pick three more up with the left hand. In this manner one can keep the eggs constantly moving from the left box to the right. It makes no difference which end of the egg is inserted. There should also be another box to receive the bad eggs. When the door of the tester is closed it will be perceived that no light can escape except that which comes directly through the egg, thus rendering a fresh egg perfectly transparent.

One accustomed to the use of my tester can, with little experience, tell the exact condition of the egg the instant he applies it to the tester, regardless of the location of the damaged spot.

Any one with quick movement can easily examine from fifteen to eighteen hundred dozen per day.

It is not necessary to work in the dark while preparing to test eggs, since, in a dark cellar, and with the door of case open, the light through door and reflector will give sufficient illumination to read by.

I am aware that it is not new to make an egg-tester with a top plate that receives eggs in its apertures, a reflector within the body, and a lamp in the center; but

What I claim is—

The combination, with case and inside lamp, of the tube C, at an angle to and a little above burner of lamp, and the egg-holding cap D *d*, arranged in outer end of said tube, as and for the purpose specified.

WILLIAM W. WILSON.

Witnesses:
J. W. RINGO,
JOHN E. THRELKELD.